(No Model.)

J. ENGLAND.
BELT COUPLING.

No. 311,883. Patented Feb. 10, 1885.

Witnesses,

Inventor,
James England by

UNITED STATES PATENT OFFICE.

JAMES ENGLAND, OF NEW YORK, N. Y., ASSIGNOR TO ISAAC S. McGIEHAN, OF SAME PLACE.

BELT-COUPLING.

SPECIFICATION forming part of Letters Patent No. 311,883, dated February 10, 1885.

Application filed November 7, 1883. (No model.)

*To all whom it may concern:*

Be it known that I, JAMES ENGLAND, of the city, county, and State of New York, have invented a new and useful Improved Belt-Coupling, of which the following is a specification.

This invention relates to double-ended gimlet-pointed screws to act as belt-coupling for round belts—such as those used on sewing-machines, dentists' drilling-machines, and other light machinery. The object sought is to produce a coupling which obviates the necessity of having any metallic connection between the coupling and the wheels to which the belt is applied, thus destroying all "slip" or lost motion, reducing the jar to the machinery, and producing an easy and perfect running machine, as will be hereinafter more fully explained.

A very serious difficulty with the running of sewing-machines and all other machinery to which belts are applied is the slip or lost motion, which is caused by either the imperfect tension of the belt or the application of a coupler whose metal surface strikes the periphery of the wheel (which is usually smooth) and slides over until the belt again takes its grip. All couplings which take their hold from the outside of the belt, or those which have outside wrapping, must necessarily be of greater diameter than the belt itself. Consequently when such a coupling comes in contact with either of the wheels it increases the tension of the belt and will create a jar to the machinery. It also creates a metallic connection between the coupling and the wheels to which it is attached, and is therefore injurious to both wheels and belt.

The accompanying drawings, forming part of this specification, are intended to illustrate my improved screw as applied for belt-couplings.

Figure 1:
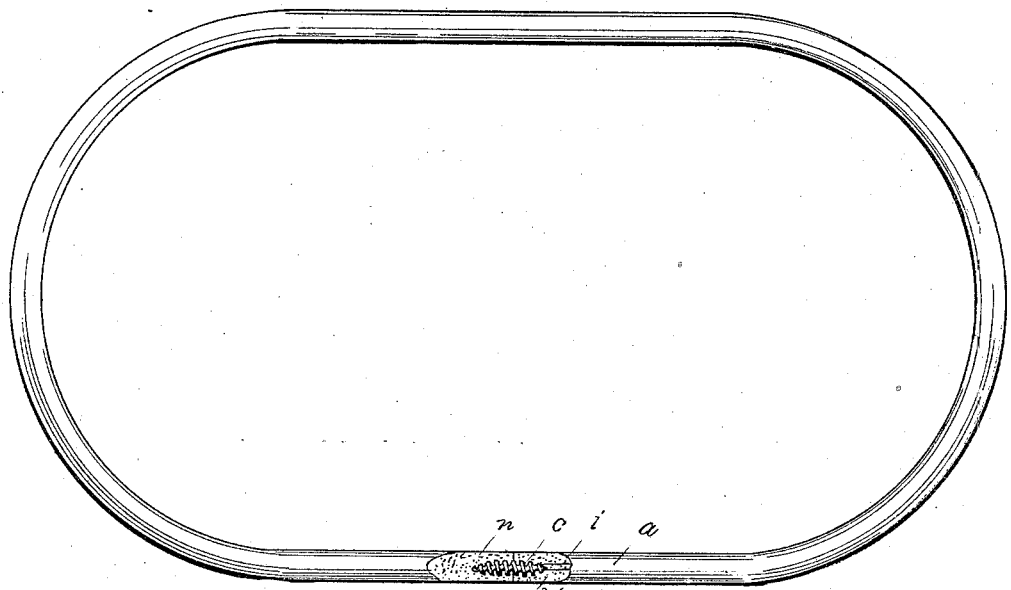
Figure 2:
Figure 3:
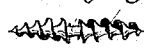

Figure 1 represents the belt after the screw $e$ is inserted, with a portion of the belt $a$ broken away to show the screw. Fig. 2 illustrates another kind of screw I employ when it is necessary that the belt should have a very tight tension, and Fig. 3 illustrates the screw $e$ as it appears before it is inserted in the belt.

This screw $e$ is made with a ratchet-thread and provided with a shank, $o$, at its middle, which, being smaller than the thread portion, will prevent increasing the size of the belt at its joint. It will be thus seen that a belt with a screw, $e$, attached will resist a very great strain. The screw $e$, which is provided with a wood-screw or concave thread, may, nevertheless, be used in all ordinary circumstances.

In order to attach my improved coupling-screw, I first perforate the end $n$ of the belt with an awl the depth I desire the screw to go. I then insert the screw about one-half its length into that end of the belt, in order to make that end of the screw more firm and to prevent its turning when the belt is being detached. I sometimes dip the screw partly in mucilage or cement before inserting it in the belt. After the screw is inserted in the end $n$ of the belt I then perforate the end $n'$ with a very small awl for about two inches, and the belt is ready to be coupled together simply by twisting one end of the belt a few turns in a reverse direction, and then screwing the end $n'$ onto the projecting portion of the screw. The object of perforating the end $n'$ so deeply is to admit of a piece being cut off in order to shorten the belt as circumstances may require.

It is thus obviously seen that my improved screw as applied for belt-couplings is superior to many other kinds of couplings now in use. The following are some of its advantages: It will admit of the belt being shortened as little or as much as may be desirable. Thus the same tension may be reserved from the time the belt is first applied until it is worn out. It is simple, inexpensive, and easy to apply. It increases the life of the belt in many respects. It reduces the jar and shake of the machinery. It has no metallic connection, which makes it perfect running, positive acting, without slip or lost motion.

I do not confine myself to the use of my improved screw as a belt-coupling, as it may be used for many other purposes.

Having thus described my invention, what I claim as new and useful, and desire to secure by Letters Patent, is—

As an article of manufacture, a double-ended gimlet-pointed screw provided with a suitable thread running its entire length and adapted to be applied to a belt, substantially as described.

In testimony that I claim the foregoing improved belt-coupling as above described, I have hereunto set my hand this 5th day of November, 1883.

JAMES ENGLAND.

Witnesses:
L. F. LONGLEY,
WALTER SNYDER.